(12) United States Patent
Starner et al.

(10) Patent No.: US 9,466,112 B1
(45) Date of Patent: Oct. 11, 2016

(54) ZOOM AND IMAGE CAPTURE BASED ON FEATURES OF INTEREST

(71) Applicant: Google Inc., Mountain View, CA (US)

(72) Inventors: Thad Eugene Starner, Mountain View, CA (US); Joshua Weaver, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/885,763

(22) Filed: Oct. 16, 2015

Related U.S. Application Data

(63) Continuation of application No. 13/617,608, filed on Sep. 14, 2012, now Pat. No. 9,197,864.

(60) Provisional application No. 61/584,100, filed on Jan. 6, 2012.

(51) Int. Cl.
| | |
|---|---|
| H04N 5/232 | (2006.01) |
| G06T 7/00 | (2006.01) |
| H04N 5/262 | (2006.01) |
| H04N 5/225 | (2006.01) |
| G02B 27/01 | (2006.01) |
| G06F 3/01 | (2006.01) |
| G06F 17/30 | (2006.01) |

(52) U.S. Cl.
CPC .......... *G06T 7/0042* (2013.01); *G02B 27/017* (2013.01); *G06F 3/013* (2013.01); *G06F 17/30256* (2013.01); *G06F 17/30268* (2013.01); *H04N 5/2253* (2013.01); *H04N 5/23293* (2013.01); *H04N 5/23296* (2013.01); *H04N 5/2628* (2013.01); *G02B 2027/0178* (2013.01)

(58) Field of Classification Search
CPC ...................................................... H04N 7/181
USPC ............... 348/240.99, 77; 455/566; 345/7–9
See application file for complete search history.

(56) References Cited

U.S. PATENT DOCUMENTS

| | | | | |
|---|---|---|---|---|
| 2002/0184098 A1* | 12/2002 | Giraud | ................... | G06Q 30/02 705/14.66 |
| 2011/0310119 A1* | 12/2011 | Takagi | .................... | G06T 11/60 345/620 |
| 2014/0347363 A1* | 11/2014 | Kaburlasos | ............. | G06F 3/013 345/428 |

* cited by examiner

*Primary Examiner* — Joel Fosselman

(57) ABSTRACT

Methods and systems for intelligently zooming to and capturing a first image of a feature of interest are provided. The feature of interest may be determined based on a first interest criteria. The captured image may be provided to a user, who may indicate a level of interest in the feature of interest. The level of interest may be based upon to store the captured image and capture another image. The level of interest may be a gradient value, or a binary value. The level of interest may be based upon to determine whether to store the captured image, and if so, a resolution at which the captured image is to be stored. The level of interest may also be based upon to determine whether to zoom to and capture a second image of a second feature of interest based on the first interest criteria or a second interest criteria.

18 Claims, 13 Drawing Sheets

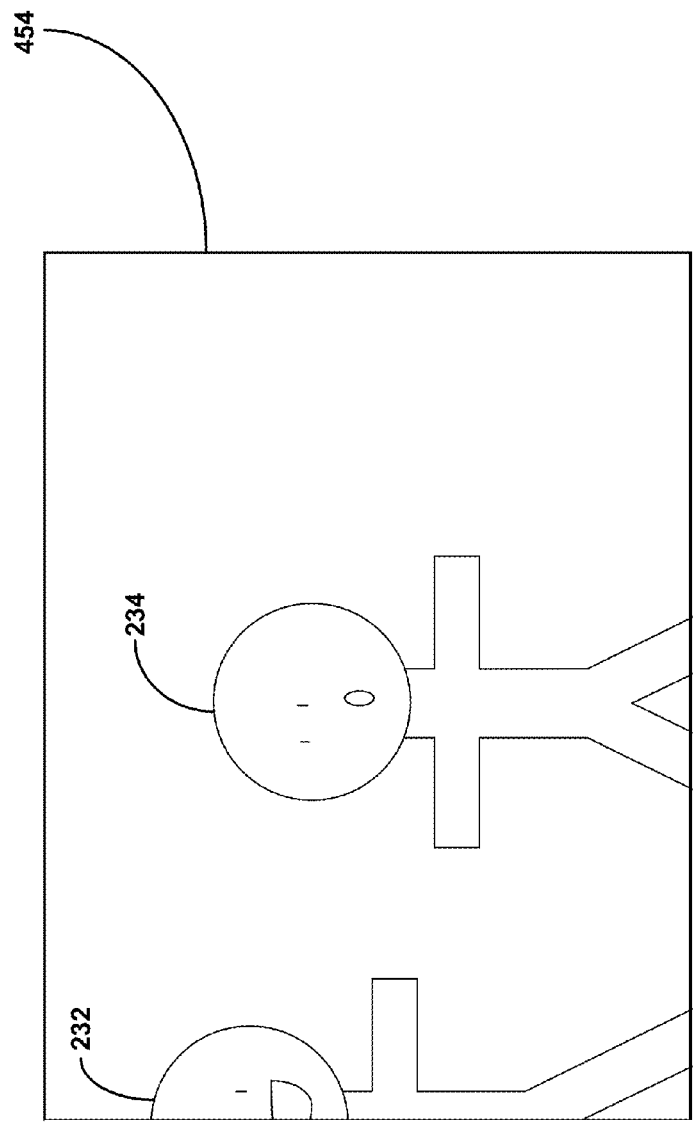

ZOOM AND IMAGE CAPTURE BASED ON FEATURES OF INTEREST

CROSS-REFERENCE TO RELATED APPLICATION

The present application is a continuation of U.S. patent application Ser. No. 13/617,608, filed Sep. 14, 2012, and claims priority to U.S. Provisional Application Ser. No. 61/584,100, filed on Jan. 6, 2012, the entire contents of both are hereby incorporated by reference.

BACKGROUND

Unless otherwise indicated herein, the materials described in this section are not prior art to the claims in this application and are not admitted to be prior art by inclusion in this section.

Wearable systems can integrate various elements, such as miniaturized computers, cameras, input devices, sensors, detectors, image displays, wireless communication devices as well as image and audio processors, into a device that can be worn by a user. Such devices provide a mobile and lightweight solution to communicating, computing and interacting with one's environment. With the advance of technologies associated with wearable systems as well as miniaturized electronic components and optical elements, it has become possible to consider wearable compact cameras for capturing the wearer's experiences of the real world.

By orienting the wearable camera towards the same general direction as the wearer's point of view, media representing a real world experience of the user can be captured. The captured media may include video, audio, and still frame images. In some cases, the media may be captured continuously. In other cases, the media may be captured based on inputs from the wearer.

SUMMARY

Disclosed herein are systems and methods that may be implemented to provide an efficient and intuitive search for, and navigation of, stored information associated with a user's real-world experience.

In one example, a system with at least one processor and a non-transitory computer readable medium is provided. Program instructions may be stored on the non-transitory computer readable medium and may be executable by the at least one processor to perform functions. The functions include receiving image data corresponding to a field of view of an environment, and determining a first feature of interest within the first field of view based on a first interest criteria. The functions further include causing a camera to zoom to and capture a first image of a portion of the field of view that includes the first feature of interest, and providing the image of the first feature of interest on a display. The functions also include determining a level of interest in the first feature of interest, and capturing a second image based on the level of interest.

In a second example, a method is provided that includes receiving image data corresponding to a field of view of an environment, and determining a first feature of interest within the first field of view based on a first interest criteria. The method further includes causing a camera to zoom to and capture an image of a portion of the field of view that includes the first feature of interest. The method also includes causing the captured image of the first feature of interest to be stored in an image-attribute database including data for a set of images. The data for a given image of the set of images specifies one or more attributes from a set of attributes.

In a third example, a non-transitory computer readable memory with instructions stored thereon is provided. The instructions may be executable by a computing device to cause the computing device to perform functions. The functions include receiving image data corresponding to a field of view of an environment, and determining a first feature of interest within the first field of view based on a first interest criteria. The functions further include causing a camera to zoom to and capture a first image of a portion of the field of view that includes the first feature of interest. The functions also include providing the first image of the first feature of interest on a display, determining a level of interest in the first feature of interest, and capturing a second image based on the level of interest.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 4B illustrates a sixth field of view for capturing an image of a fifth feature of interest determined according to the second interest criteria.

DETAILED DESCRIPTION

Figure 1A:
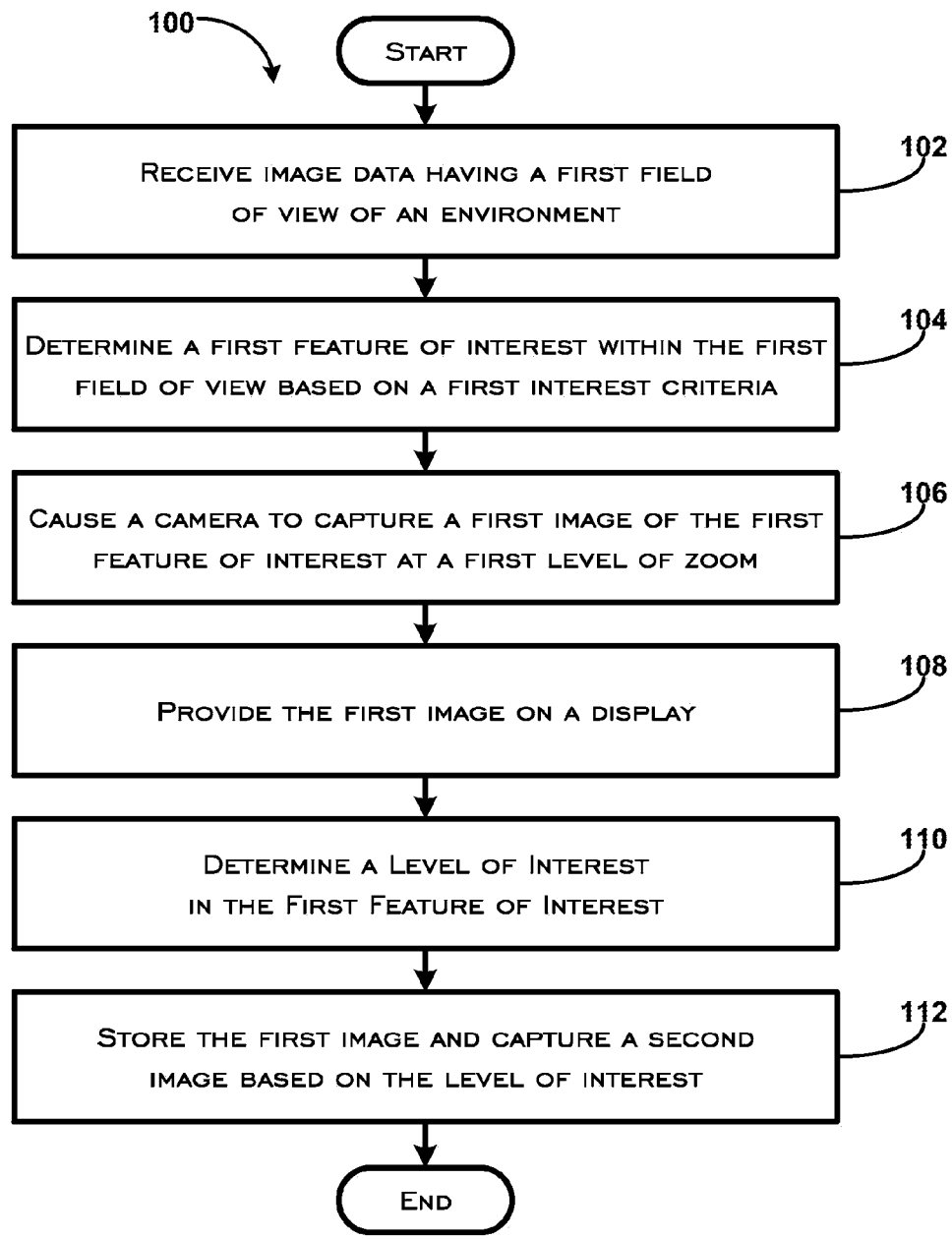
FIG. 1A is a block diagram of an exemplary method for intelligently zooming and capturing images.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

In an example scenario, a person who is wearing a head-mountable camera (HMD) may be surrounded by various sorts of activity and objects, and may wish to take a closer look at a series of related objects and capture images for each of the objects. Accordingly, example embodiments may be implemented on the HMD to intelligently determine and display potentially interesting features of the wearer's surroundings (e.g., objects or people), and to progressively display images of related features and/or sub-features. This may allow the HMD wearer to explore multi-part features and/or related features in a logical and progressive manner, without having to explicitly indicate what features they are interested in and/or indicate how to navigate through related features, or navigate between sub-features of an interesting feature.

For example, the HMD may include a point-of-view camera that is configured to capture a wide-angle image or video from the point of view of the HMD wearer. The HMD may then process the captured image or video to determine objects within the point of view of the HMD wearer that may be of interest to the HMD wearer. The HMD may determine objects of interest to the HMD wearer based on interests of the wearer, and may determine the progression of capturing images based on how close the object is or how interested the wearer might be in the object. In a more specific example, the wearer may be walking by a movie theater on the way somewhere else. The HMD may determine that the wearer is interested in movies and may therefore zoom to and capture an image of the sign of the theater. The wearer may indicate whether the object in the captured image is of interest. If the wearer is not interested in the theater sign, the HMD may intelligently look for a different object that the wearer may be interested in. If the wearer is interested in the theater sign, the HMD may intelligently zoom to a title of a movie being played at the theater shown on a sign and capture an image of the title. If the wearer is not interested in the movie, the HMD may intelligently zoom to the title of a different movie being played at the theater. If the wearer is interested in the movie, the HMD may intelligently zoom to a listing of show times for the movie of interest, and capture an image of the show time.

This use of the HMD may also be applied to other scenarios for capturing other elements of the user's life experiences, whether the experiences are expected, unexpected, memorable, or in passing. Further discussions relating to devices and methods for capturing images representing experiences from the perspective of a user may be found below in more detail. While the discussions herein generally refer to the capturing of an image based on a determined feature of interest, other content may be captured accordingly as well. The other content may include audio content, video content without an audio component, or video content with an audio component.

2. First Example Method for Intelligent Zoom and Image Capture

FIG. 1A is a block diagram of an exemplary method 100 for intelligently zooming and capturing images. While examples described herein may refer specifically to the use of an HMD, those skilled in the art will appreciate that any wearable computing device with a camera with a zoom function may be configured to execute the methods described herein to achieve the desired results. Method 100 may include one or more operations, functions, or actions as illustrated by one or more of blocks 102-112. Although the blocks are illustrated in a sequential order, these blocks may also be performed in parallel, and/or in a different order than those described herein. Also, the various blocks may be combined into fewer blocks, divided into additional blocks, and/or removed, depending upon the desired implementation.

In addition, for the method 100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

At block 102, the method 200 involves receiving image data corresponding to a field of view of an environment. As mentioned previously, a user may be wearing an HMD with a camera having a zoom function, while present in the environment. In this case, image data may be received from the camera and may be in the form of a video or a series of still images. As such, the field of view of the environment may be the imaging field of view of the camera at an initial level of zoom of the camera.

Figure 2:
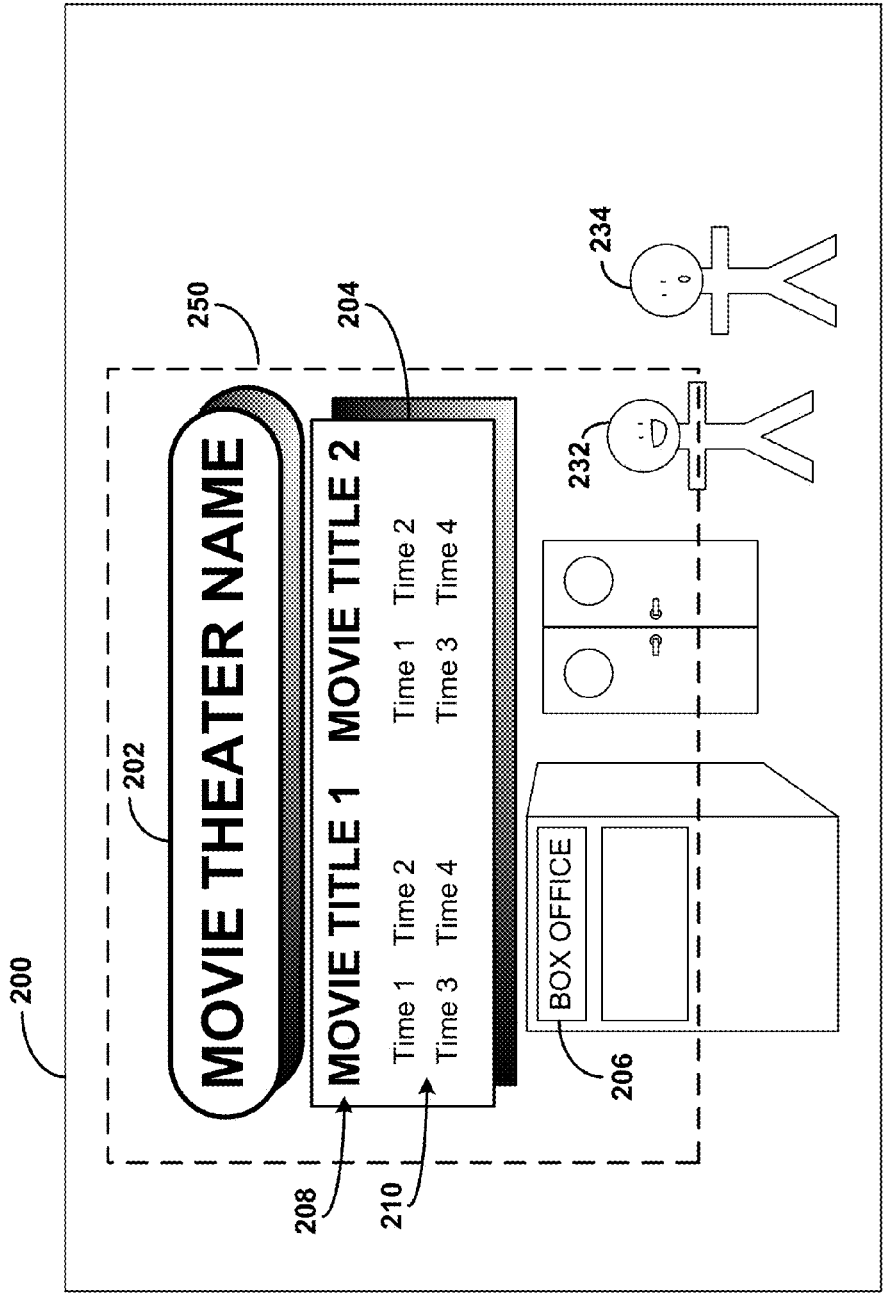
FIG. 2 illustrates an environment in which an image within a first field of view may be captured.

FIG. 2 illustrates an environment 200 in which an image within a first field of view 250 may be captured. As shown, the environment 200 may be an area outside a movie theater. Within the environment, there may be signs with text indicating the name of the theater 202, titles for the movies that are playing 208, and times for the movies that are playing 210. The environment may also include a sign for the box office 206, and other movie goers such as a first person 232 and a second person 234. In this case, the first field of view 250 may be the imaging field of view of the HMD camera at the initial level of zoom, as mentioned above.

At block 104, the method 100 involves determining a first feature of interest within the field of view 250 of the environment 200 based on a first interest criteria. The environment 200 may include a number of features the user may be interested in. For example, the movie theater name 202, the titles for the movies that are playing 208, and the times for the moves that are playing 210 may all be features the user may be interested in. Further, the user may be interested in the first person 232 and the second person 234. In one case, the first person 232 and the second person 234 may be recognizable friends of the user.

Features of interest to the user may be determined based on a plurality of interest criteria. Interest criteria may include text, human faces, colors, shapes, or any qualification that may be discerned through image processing by a computing device. Interest criteria may further include certain types of objects or object categories such as signs, animals, vehicles, buildings, or landscape, etc. Within the plurality of interest criteria, at least one interest criterion may be based on to determine features of interest. The at least one interest criterion may be predetermined. For instance, the user of the HMD may indicate that the user is interested in information presented in text form, and accordingly, the features of interest may be determined based on the interest criterion of text. In another instance, the interest criterion of text may further be combined with additional interest criteria for determining features of interest, such that if text recognition is available, features of interest may be determined based on text representing the additional interest criteria. For example, the user of the HMD may indicate that the user is interested in certain brands of cars. In this example, features of interest may be determined based on text identifying a vehicle or advertisement related to the certain brands of cars the user is interest in.

In another example, features of interest may be determined based on the interest criteria of human faces and colors. For instance, the user may indicate an interest in people having unusual hair color (i.e. green, blue, pink, or purple hair). In this example, the features of interest may be determined based on recognizing human faces and determining a hair color of person whose face has been recognized. In addition, interest criteria may include a degree of motion, such that features of interest may be determined based on the degree of motion detected within the field of view 250 of the environment 200. For example, the degree of motion may indicate a movement speed and/or a measure of presence in the field of view 250 of an object that can be based upon to determine whether the object may be a feature of interest. In some cases, the HMD may further be configured to "learn" which interest criteria may be particularly applicable to the user based on the user's previous behaviors.

In yet another example, interest criteria based upon to determine features of interest may be determined based on real-time input from the user. For instance, the user may indicate that images of features of interest determined based on the interest criteria of text are to be captured by selecting a "text" icon provided on the HMD or by saying "text." Other example key words representing interest criteria may also be implemented.

As shown in FIG. 2, the first field of view 250 of the environment 200 includes text indicating the name of the theater 202, titles for the movies that are playing 208, times for the movies that are playing 210, as well as the sign for the box office 206. The first field of view 250 also includes the face of the first person 232. Within the first field of view 250, features of interest based on the first interest criteria may include each feature in the first field of view 250 indicated by text as well as the first person 232. In this case, the name of the theater 202 may be determined as the first feature of interest based on the first interest criteria of text, and in this case, because the name of the theater 202 has the largest font size of the different text elements.

In some cases, the HMD may include an eye-tracking device configured to determine where an attention or gaze of the user is directed. In such cases, eye-tracking data from the eye-tracking device may be based on to determine features of interest, in addition to interest criteria. In addition to gaze direction, the eye-tracking data may further provide information regarding dwell time and pupil dilation changes that may also be based on to determine features of interest.

In addition to the eye-tracking device, the HMD may also include various physiological sensors for detecting physiological responses such as galvanic skin responses, pupillary responses, electrocardiographic responses, electroencephalographic responses, body temperature, blood pressure, and hemoglobin oxygenation responses. As such, the detected physiological responses may further be based on to determine features of interest.

At block 106, the method 100 involves causing a camera to zoom to and capture a first image of a portion of the field of view that includes the first feature of interest. As discussed above, the name of the theater 202 may be determined as the first feature of interest. Accordingly, a first image of the name of the theater 202 may be captured. In one example, zooming to the portion of the field of view that includes the first feature of interest may result in the camera zooming to a first level of zoom, which may be an increased level of zoom from the initial level of zoom. In other words, the first image may be a zoomed-in image of the name of the theater 202. The first level of zoom may be determined based on a number of factors. For instance, the first level of zoom may be determined such that the entire name of the theater 202 may be included in the first image.

In one example, determining the first level of zoom may involve determining characteristics of the first feature of interest. In one case, the characteristics of the first feature of interest may indicate at least a size of the first feature of interest. In this case, an extent of zoom for the first level of zoom may be determined such that at least the entire first feature of interest (such as the entire marquee of the movie theater, rather than just the text representing the name of the theater) may be included in the image captured by the camera. This may further be applicable to determining subsequent levels of zoom for subsequent features of interests.

In a further example, the camera may have optical, digital, or both types of zoom capabilities. In one case, the camera may be adjusted to center on the first feature of interest to provide optimal optical zoom when capturing the image. In another case, the camera may not be angularly adjustable and may therefore be configured to provide digital zoom when capturing the image. In yet another case, the camera may be configured to provide both optical zoom and digital zoom. For instance, if the camera is unable to fully center on the first feature of interest, the camera may be configured to provide optical zoom to the extent that the entire first feature of interest is within the camera field of view, and subsequently provide digital zoom to capture the first image of a portion of the field of view that includes the first feature of interest.

Figure 3A:
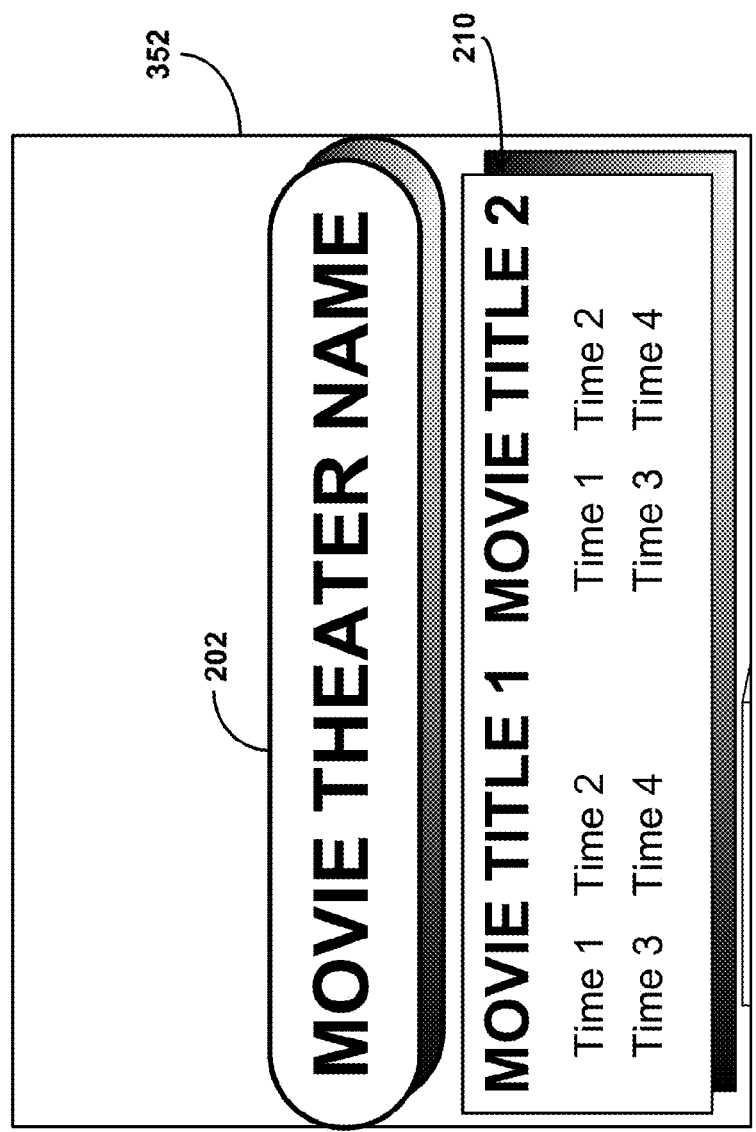
FIG. 3A illustrates a second field of view for capturing an image of a first feature of interest determined according to a first interest criteria.

FIG. 3A illustrates a second field of view 352 for capturing the first image of the first feature of interest, which in this case may be the name of theater 202. As shown, the second field of view 352 of the first image may be a zoomed-in view from the first field of view 250. As such, the second field of view 352 of the environment 200 may be narrower than the first field of view 250 of the environment 200.

As discussed previously, a feature of interest may further be determined based on a degree of motion. In one example, capturing the first image of the portion of the field of view that includes the first feature of interest may involve capturing video of the portion of the field of view. In one case, a duration of the captured video may be a predetermined duration, such as 5 seconds. In another case, the duration of the captured video may be further based on the degree of motion of the feature of interest. For instance, the feature of interest may be determined based on when a degree of motion of the feature of interest exceeds a threshold degree of motion. As such, the duration of the captured video may be as long as the degree of motion of the feature of interest is above the threshold degree of motion.

At block 108, the method 100 involves providing the image of the first feature of interest on a display. In one example, the display may be a component of the HMD worn by the user, such that the user may view what the HMD may have determined to be a feature of interest upon capturing the first image of the first feature of interest. In one case, the user may be prompted to indicate whether the user is interested in the determined feature of interest when the first image of the first feature of interest is displayed. In this case, if the user indicates interest in the determined feature of interest, the user may further be prompted to indicate whether the captured first image is to be stored. In another case, the user may simply be prompted to indicate whether the captured first image is to be stored.

At block 110, the method 100 involves determining a level of interest in the first feature of interest. In one case, determining the level of interest may involve acquiring interest input data indicating a level of interest in the first feature of interest. For example, the user may provide the interest input data by providing a gradient value indicating the level of interest in the first feature of interest. For instance, the user may provide a numeric value between 0 and 10, with 10 indicating extremely high interest, 0 indicating absolutely no interest, and 1-9 representing the varying levels in between.

In another example, the user may provide the interest input data by providing a binary value indicating the level of interest. In other words, the user may provide either a first value affirming interest in the first feature of interest, or a second value denying interest in the first feature of interest. In this example, the interest input data provided by the user may not explicitly indicate the user's level of interest. For instance, the user may be prompted to indicate whether the first image is to be stored, as mentioned above. By indicating the first image is to be stored, the user may be implicitly affirming interest in the first feature of interest. On the other hand, the user may be implicitly denying interest in the first feature of interest by indicating the first image is not to be stored.

In a further example, a predetermined duration of time may be implemented such that the user is assumed to affirm or deny interest in the first feature of interest if the user does not provide interest input data within the predetermined duration of time after the image of the first feature of interest has been provided on the display. For instance, the user may be given 3 seconds to provide interest input data after either the image of the first feature of interest has been provided on the display or the user has been prompted to provide interest input data. In one case, if no interest input is provided by the user after 3 seconds, the user may be considered to have denied interest in the first feature of interest. In another case, the user may be considered to have affirmed interest in the first feature of interest if no interest input is provided after the predetermined 3 seconds.

In yet another example, interest input data may be provided by the user without explicit feedback from the user. As discussed above, the HMD may include an eye-tracking device or other physiological sensors. In one instance, the interest input data may be eye-tracking data or physiological response data received upon providing the image of the first feature of interest on a display. The received eye-tracking data or physiological response data may accordingly be indicative of the user's level of interest in the first feature of interest.

As previously mentioned, the HMD may be configured to learn which interest criteria may be particularly applicable to the user based on the user's previous behaviors. In one case, the interest criteria based on to determine features of interest and the interest input data from the user in response to images of features of interest being display may be stored and processed for learning the applicable interest criteria of the user.

At block 112, the method 100 involves storing the first image and capturing a second image based on the level of interest. As mentioned above, the user may indicate whether or not the user may be in fact interested in the first feature of interest captured in the first image. In one example, the user may indicate a level of interest above a predetermined interest threshold. For instance, in the case the user provides interest input data by providing a gradient value between 0 and 10, the predetermined interest threshold may be set at 5, such that any value at 5 or above may be interpreted as affirming interest in the feature of interest. On the flip side, any value below 4 may be interpreted as denying interest in the feature of interest. Additional predetermined interest thresholds may also configured to further define the level of interest of the user with more precision.

Continuing with the example in which the user may indicate a level of interest above the predetermined interest threshold, the first image may be stored based on the indicated level of interest. In one case, the first image may be stored on a data storage medium in communication with the HMD. This may include a data storage medium physically attached to the HMD or a data storage medium within a network of computing devices in communication with the HMD.

Within the data storage medium, the first image may be stored in an image attribute database. In one example, the image-attribute database may be configured to store a set of images associated with the user wearing the HMD, and may include data for each of the images in the set of images specifying one or more attributes from a set of attributes indicating context associated with each of the images.

Figures 1B, 1C:
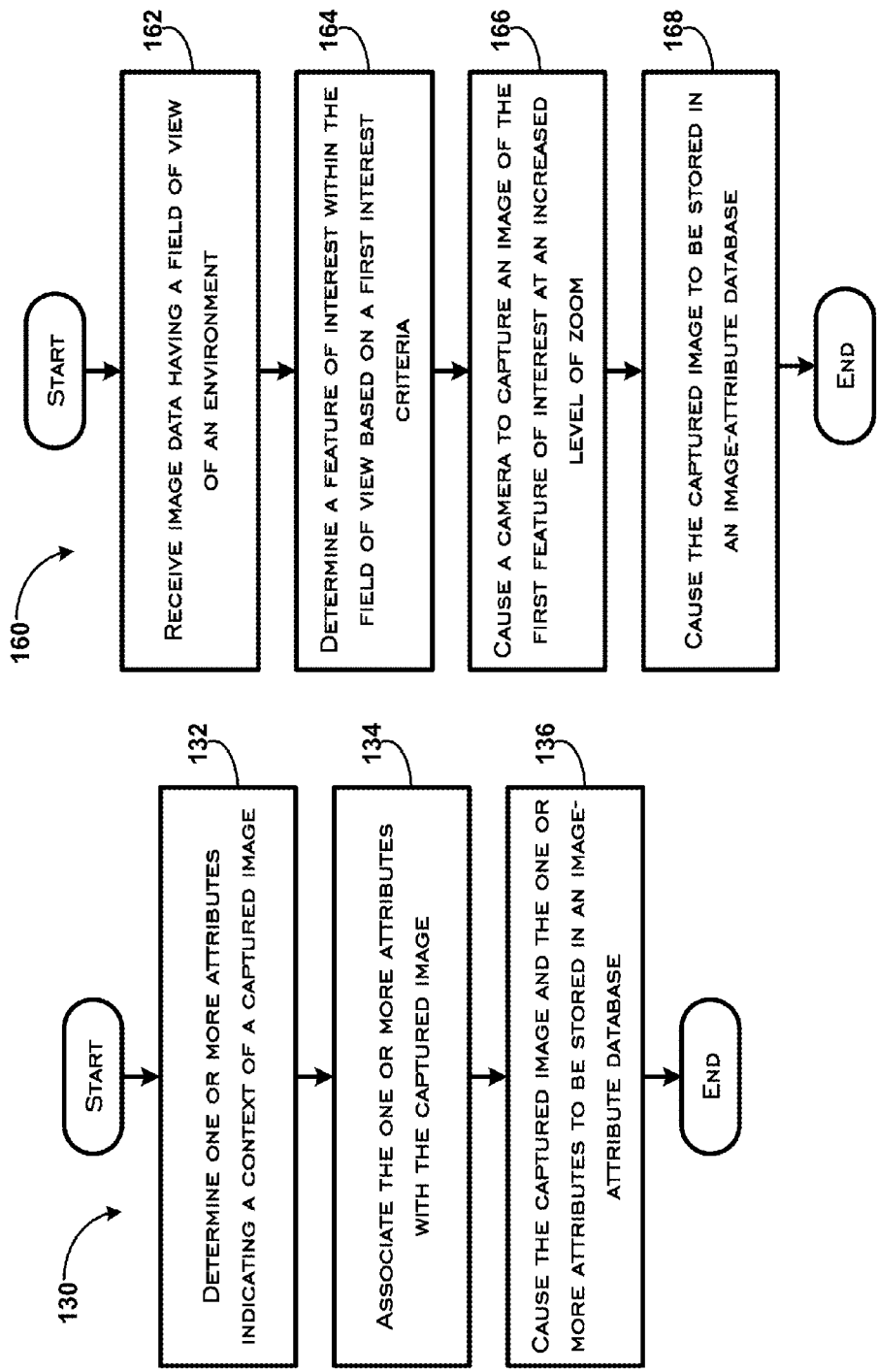
FIG. 1B is a block diagram of an exemplary method for storing a captured image in an image-attribute database.
FIG. 1C is a block diagram of an alternative exemplary method for intelligently zooming and capturing images.

FIG. 1B is a block diagram of an exemplary method 130 for storing a captured image in an image-attribute database. In particular, the method 130 includes steps for storing the captured images in an image-attribute database. While examples described herein may refer specifically to the use of an HMD, those skilled in the art will appreciate that any wearable computing device with a camera with a zoom function may be configured to execute the methods described herein to achieve the desired results. Method 130 may include one or more operations, functions, or actions as illustrated by one or more of blocks 132-136. Although the blocks are illustrated in a sequential order, these blocks may also be performed in parallel, and/or in a different order than those described herein. Also, the various blocks may be combined into fewer blocks, divided into additional blocks, and/or removed, depending upon the desired implementation.

At block 132, the method 130 involves determining one or more attributes indicating a context of the captured image. Continuing with the example above, the captured image may be the first image of the first feature of interest, which in this case is the name of the theater 202. In this case, attributes associated with the captured image may include a location of the movie theater, and a date and time when the first image captured.

In one example, the HMD may include a global positioning system (GPS) configured to determine a geographic location associated with the HMD. In this case, the geographic location of the HMD may be acquired from the GPS when the first image is captured. The HMD may further include a system clock, and the date and time may be acquired from a system clock of the HMD when the first image is captured. In another example, the time may be acquired from a server in communication with the HMD. In this instance, a local time may be acquired from the server based the time zone the wearer is in, according to the geographic location of the HMD acquired from the GPS.

At block 134, the method 130 involves associating the one or more attributes with the captured image. Continuing with the example above, the acquired location, date, and time may be associated with the first image. In addition to associating the acquired data with the first image, additional context may be determined and associated with the first image. For instance, if the location, date, and time associated with the first image indicates the user may be on the way home from work when the first image is captured, context indicating that the user is "commuting" may be determined and associated with the first image as an attribute.

At block 136, the method 130 involves causing the captured image and the one or more attributes to be stored in the image-attribute database. After relevant attributes have been associated with the captured image, the captured image may then be stored in the image-attribute database along with the determined one or more attributes. Continuing with the above example, the first image may be stored in the image-attribute database along with the location, data, and time acquired when capturing the first image.

Referring back to block 112 of FIG. 1, and continuing with the example in which the user may indicate a level of interest above the predetermined interest threshold, a second image may be captured based on the indicated level of interest. In this case, because the user indicated a level of interest above the predetermined interest threshold, the first interest criteria used to determine the first feature of interest may be validated. As such, the first interest criteria if text may be used to determine a second feature of interest within the second field of view 352 of the environment 200, and the image capture instructions may indicate that a second image should be captured of the second feature of interest.

As shown in FIG. 3A, the titles for the movies that are playing 208 may be determined as the second feature of interest within the second field of view 352 in a similar manner to how the name of the theater 202 may have been determined as the first feature of interest within the first field of view 250. In this case, the text of the titles for the movies that are playing 208 may be smaller than the text of the name of the theater 202. Accordingly, the second image of the second feature of interest may be captured at a second level of zoom, which may be higher than the first level of zoom.

Figure 3B:
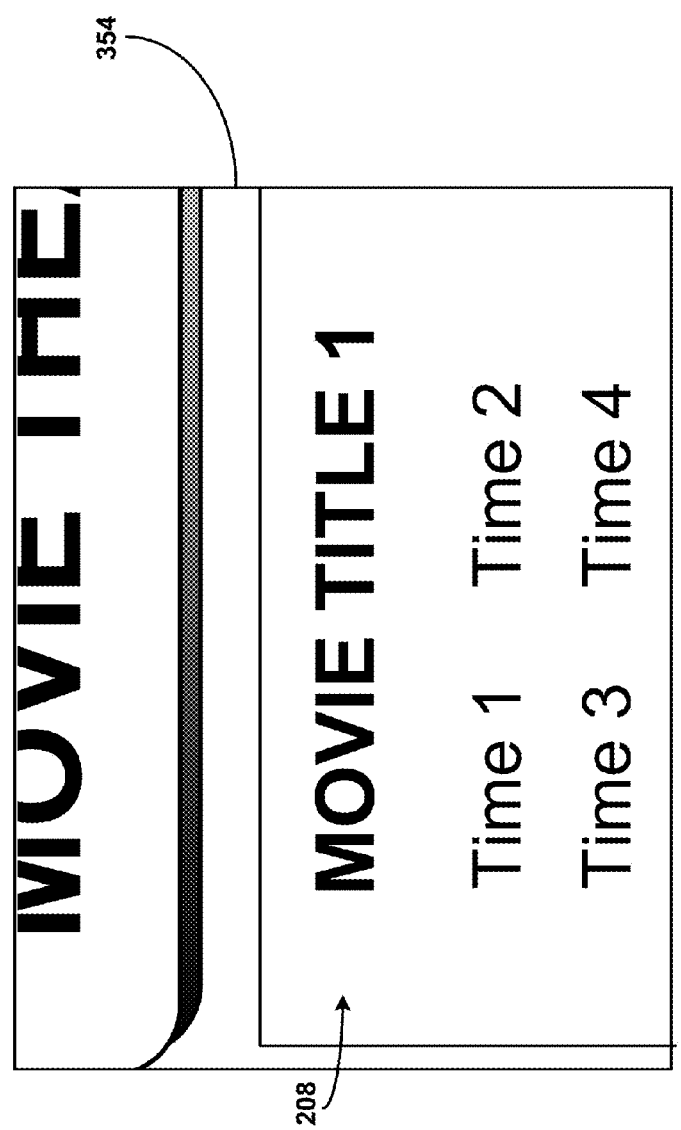
FIG. 3B illustrates a third field of view for capturing an image of a second feature of interest determined according to the first interest criteria.

FIG. 3B illustrates a third field of view 354 for capturing an image of the second feature of interest determined according to the first interest criteria of text. As shown, the second image may be an image of the first third field of view 354, which includes the second feature of interest, which in this case may be the titles for the movies that are playing 208. As such, because the second level of zoom may be higher than the first level of zoom, the third field of view 354 of the environment 200 may be narrower than the second field of view 352 of the environment 200.

Similar to the case of the first image, the second image may also be provided on a display for the user to view, and the user may then indicate a level of interest in the second feature of interest. Based on the level of interest indicated by the user, a third feature of interest within the third field of view 354 of the environment 200 may be determined, and a third image of the third feature of interest may be captured according to the same first interest criteria of text.

Figure 3C:
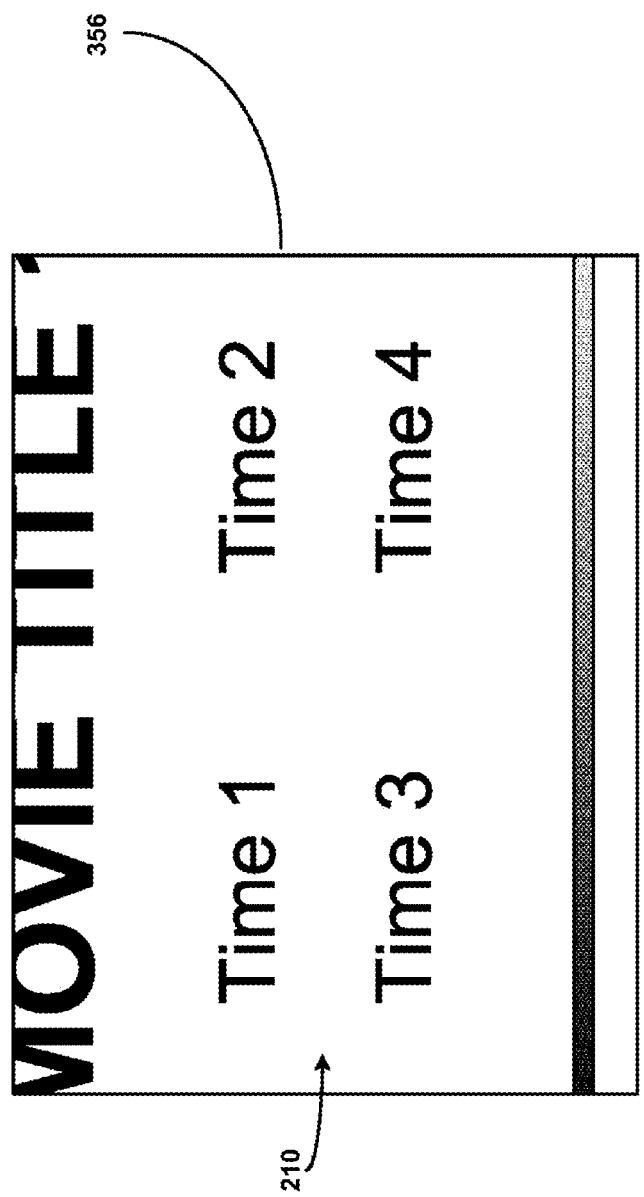
FIG. 3C illustrates a fourth field of view for capturing an image of a third feature of interest determined according to the first interest criteria.

FIG. 3C illustrates a fourth field of view 356 for capturing an image of a third feature of interest determined according to the first interest criteria. As shown, times for the movies that are playing 210 may be determined as the third feature of interest. The size of text for the times for the moves that are playing 210 may be smaller than the size of the text for the movies that are playing 208. As such the third image may be captured at a level of zoom higher than the second level of zoom. Accordingly, the fourth field of view 356 of the environment 200 may be narrower than the third field of view 354 of the environment 200.

In further embodiment, the level of interest indicated by the user may also be based on to determine image capture instructions relating a quality of the image captured. For instance, if the user indicates a level of interest just above the predetermined interest threshold, the image may be captured at a relatively low resolution. On the other hand, if the user indicates a high level of interest, a high resolution image may be captured. In this case, the camera may be configured to capture a high-definition video if the indicated level of interest is sufficiently high. In other words, additional thresholds for different levels of capture qualities of images and videos may be implemented.

Accordingly, in the case a gradient value is provided to indicate a level of interest, a range of image capture resolutions may be configured to correspond to different levels of interest within the range of gradient values. In other words, by indicating a level of interest within the range of gradient values, the user may also be indicating the image resolution at which the image of the feature of interest is to be captured.

Thus far, the discussions in connection to FIGS. 3A-3C have related to cases in which the user indicates interest in the determined features of interest. Referring back to block 112 of FIG. 1A, the user may in fact indicate a level of interest below the predetermined interest threshold. In such a case, a fourth feature of interest may be determined within the first field of view 250 of the environment 200. In other words, the camera may pan out from the second field of view 352 back to the first field of view 250 and determine the fourth feature of interest according to a second interest criteria. In one case, the second interest criteria may be the same as the first interest criteria of text. In such a case, the fourth feature of interest may be determined as the sign for the box office 206.

Figure 4A:
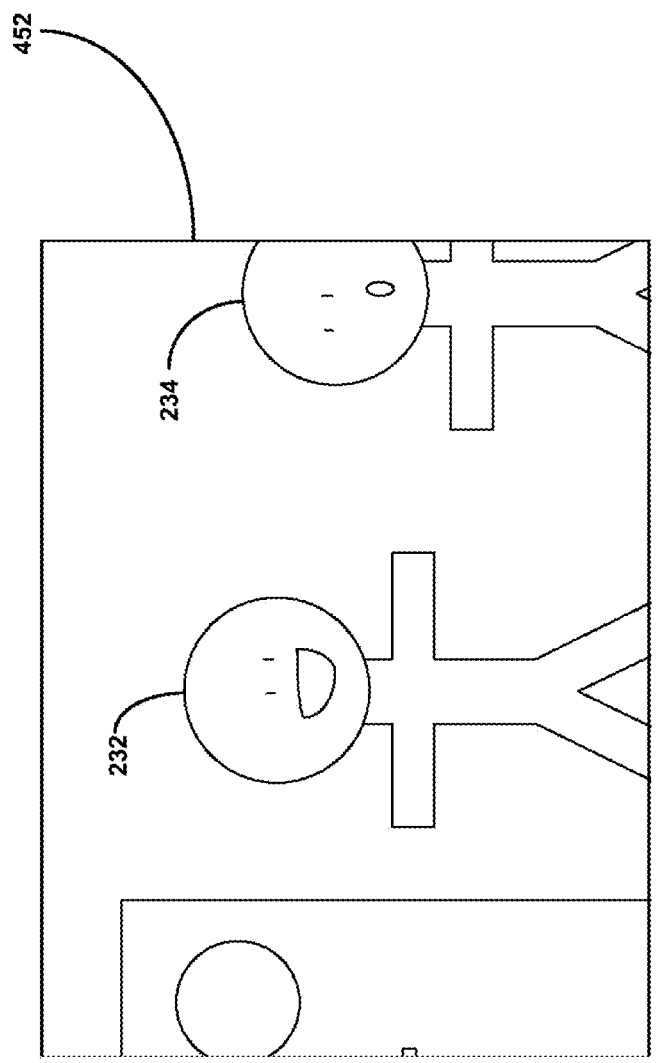
FIG. 4A illustrates a fifth field of view for capturing an image of a fourth feature of interest determined according to a second interest criteria.

In another case the second interest criteria may be that of human faces. As such, the fourth feature of interest may be determined as the first person 232. Accordingly, the camera may zoom-in on the first person 232 such that a fourth image may be captured of the first person 232. FIG. 4A illustrates a fifth field of view 452 for capturing the fourth image of the fourth feature of interest determined according to the second interest criteria of human faces. As shown, the fifth field of view 452 has a narrower view than the first field of view 250 of the environment 200 because the fourth image may have been captured at a fourth level of zoom higher than the initial level of zoom of the camera.

The fourth image of the first person 232 may then be provided for the user to view. In this case, the user may indicate a level of interest above the predetermined interest threshold and accordingly, a fifth feature of interest may be determined based on the second interest criteria of human faces within the fifth field of view 452. As such, the second person 234 may be determined as the fifth feature of interest.

FIG. 4B illustrates a sixth field of view 454 for capturing a fifth image of the fifth feature of interest determined according to the second interest criteria. In this case, because the second person 234 and the first person 232 may be similar in size, the level of zoom at which the fifth image is captured may be similar to the fourth level of zoom. As such, the sixth field of view 454 may be similar in scope to the fifth field of view 452.

Note that while the above example describes determining features of interest based on different interest criteria, when the user indicates a level of interest below the predetermined interest threshold, different interest criteria may be based on to determine features of interest when no additional feature of interest are determined within the field of view. For instance, referring back to FIG. 3C, no additional features of interest based on the interest criteria of text may be found. In such a case, the field of view may be widened by panning out, and additional features of interest, based on either the original or different interest criteria may be determined within the widened field of view.

3. Second Example Method for Intelligent Zoom and Image Capture

As discussed above, the method 100 involves determining a feature of interest within a field of view, capturing an image of the feature of interest, providing the image of the feature of interest to the user, and determining storage and further image capture instructions according to feedback from the user. In one example, the method 100 may be configured to store images and capture additional images without feedback from the user.

FIG. 1C is a block diagram of an alternative exemplary method 160 for intelligently zooming and capturing images. While examples described herein may refer specifically to the use of an HMD, those skilled in the art will appreciate that any wearable computing device with a camera with a zoom function may be configured to execute the methods described herein to achieve the desired results. Method 160 may include one or more operations, functions, or actions as illustrated by one or more of blocks 162-168. Although the blocks are illustrated in a sequential order, these blocks may also be performed in parallel, and/or in a different order than those described herein. Also, the various blocks may be combined into fewer blocks, divided into additional blocks, and/or removed, depending upon the desired implementation.

As shown in FIG. 1C, block 162 involves receiving image data corresponding a field of view of an environment, block 164 involves determining a feature of interest within the field of view based on a first interest criteria, block 166 involves causing a camera to zoom to and capture an image of a portion of the field of view that includes the first feature of interest, and block 168 involves causing the captured image to be stored in an image-attribute database including data for a set of images. In one case, block 168 of method 160 may cause the captured image to be stored according to method 130 of FIG. 1B Blocks 162-166 of method 160 may be implemented similarly to block 102-106 of method 100. However, note that method 160 causes the captured image to be stored in the image-attribute database automatically, and not based on a level of interest provided by the user. Nevertheless, method 160 may still involve one or more of providing the image of the first feature of interest on a display, determine a level of interest in the first feature of interest, and storing the first image and capturing another image based on the level of interest, as described in connection to blocks 108-112 of FIG. 1A. In one case, the image of the first feature of interest may be provided on the display for a predetermined duration of time before the zooming to a second feature of interest without determining a level of interest in the first feature of interest.

As such, method 160 may be implemented as method 100 configured to automatically store each captured image, regardless of the level of interest indicated by the user. In this case, the resolution at which the to-be-automatically-stored images are captured and stored may still be determined based on the level of interest indicated by the user. Similarly, while the captured image is automatically stored, the determination of whether to zoom to and capture an image of a second feature of interest based on the first interest criteria or a second interest criteria may also be based on the level of interest indicated by the user.

4. Example Display of Captured Images

At some point, a user may wish to view images captured previously and stored in an image-attribute database. In one case, the user may be provided one image at a time on a display. In another case, the user may be provided a subset of images from the image-attribute database on the display. In this case, each image included in the subset of images may share one or more attributes.

Figure 5:
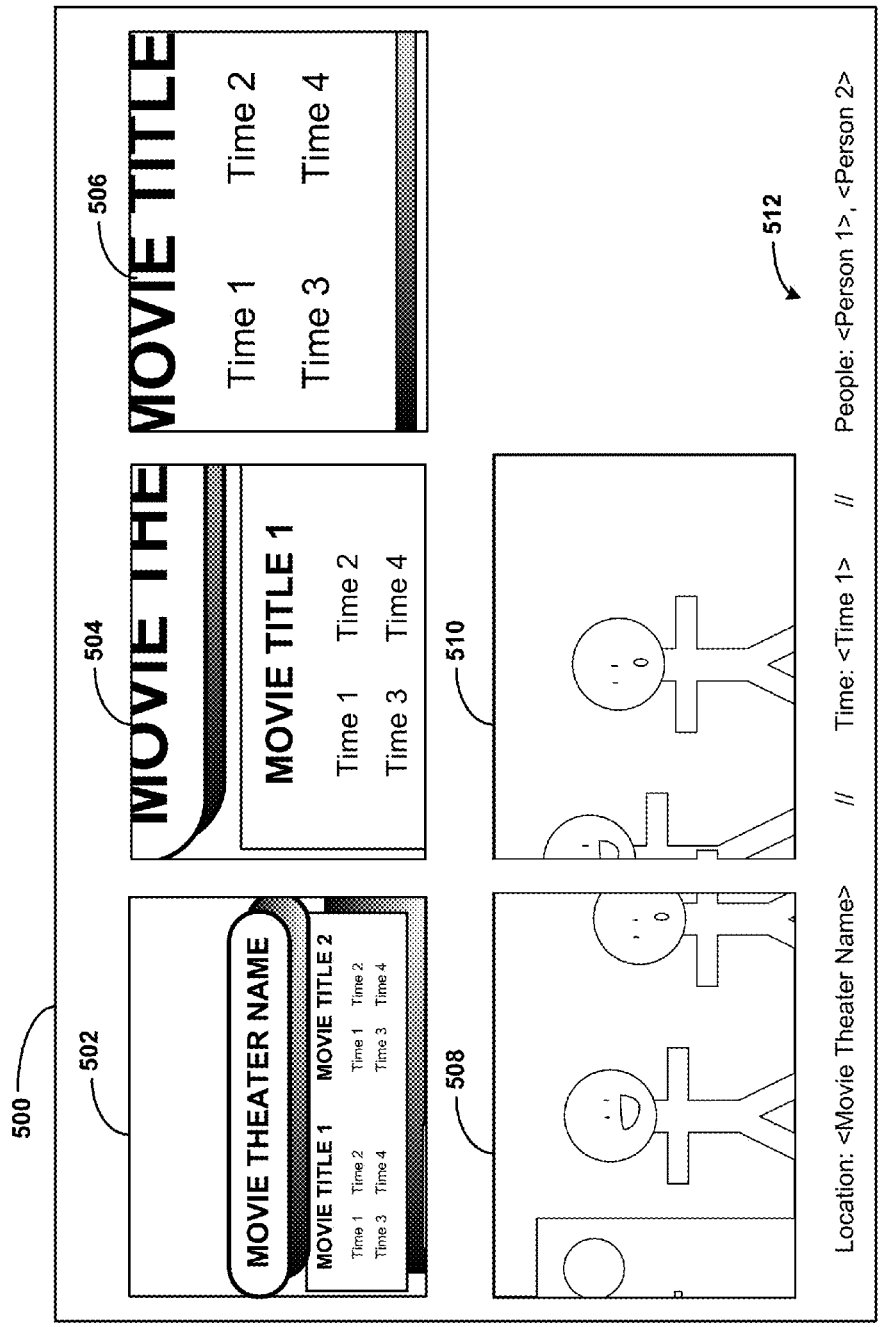
FIG. 5 illustrates an example presentation of captured images according to at least one attribute.

FIG. 5 illustrates an example presentation 500 of captured images according to one or more attributes. As shown, the presentation 500 may include a subset of images including images 502, 504, 506, 508, and 510. In one case, the images 502-510 maybe tiled in the form of a "mosaic." As mentioned above, each image in the subset of images may share one or more attributes. Accordingly, the presentation 500 may also include subset tags 512 indicating the one or more attributes associated with each image in the subset of images.

As such, the user may view all previously captured images associated with an event by indicating one or more attributes by which to view the captured images. For example, the user may wish to view images associated with a time the user attended a movie showing with friends at a particular movie theater. In this case, the user may indicate a movie theater name, and the names of the friends, and accordingly, a subset of images associated with the movie theater, and the named friends may be provided.

5. Example System and Device Architecture

Figure 6A:
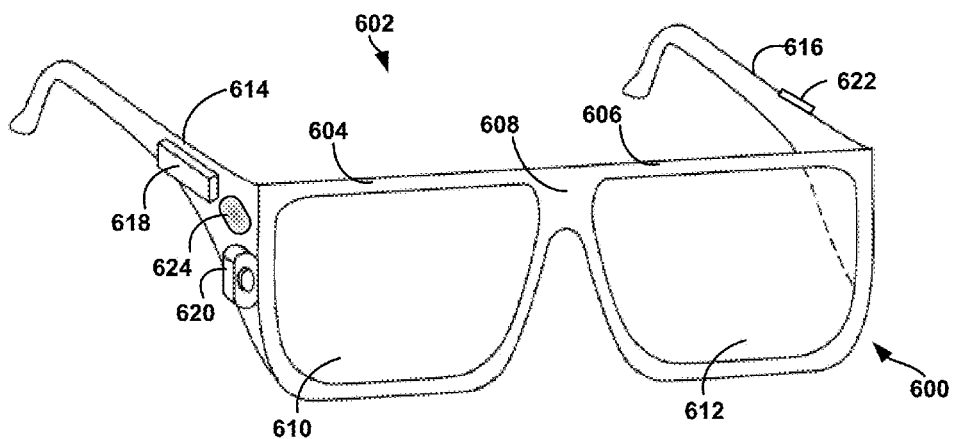
FIG. 6A illustrates an example system for receiving, transmitting, and displaying data.

FIG. 6A illustrates an example system 600 for receiving, transmitting, and displaying data. The system 600 is shown in the form of a wearable computing device, which may be implemented as the HMD discussed above, to intelligently zoom to and capture an image of a feature of interest. While FIG. 6A illustrates a head-mounted device 602 as an example of a wearable computing device, other types of wearable computing devices could additionally or alternatively be used. As illustrated in FIG. 6A, the head-mounted device 602 has frame elements including lens-frames 604, 606 and a center frame support 608, lens elements 610, 612, and extending side-arms 614, 616. The center frame support 608 and the extending side-arms 614, 616 are configured to secure the head-mounted device 602 to a user's face via a user's nose and ears, respectively.

Each of the frame elements 604, 606, and 608 and the extending side-arms 614, 616 may be formed of a solid structure of plastic and/or metal, or may be formed of a hollow structure of similar material so as to allow wiring and component interconnects to be internally routed through the head-mounted device 602. Other materials may be possible as well.

One or more of each of the lens elements 610, 612 may be formed of any material that can suitably display a projected image or graphic. Each of the lens elements 610, 612 may also be sufficiently transparent to allow a user to see through the lens element. Combining these two features of the lens elements may facilitate an augmented reality or heads-up display where the projected image or graphic is superimposed over a real-world view as perceived by the user through the lens elements 610, 612.

The extending side-arms 614, 616 may each be projections that extend away from the lens-frames 604, 606, respectively, and may be positioned behind a user's ears to secure the head-mounted device 602 to the user. The extending side-arms 614, 616 may further secure the head-mounted device 602 to the user by extending around a rear portion of the user's head. Additionally or alternatively, for example, the system 600 may connect to or be affixed within a head-mounted helmet structure. Other possibilities exist as well.

The system 600 may also include an on-board computing system 618, a video camera 620, a sensor 622, and a finger-operable touch pad 624. The on-board computing system 618 is shown to be positioned on the extending side-arm 614 of the head-mounted device 602; however, the on-board computing system 618 may be provided on other parts of the head-mounted device 602 or may be positioned remote from the head-mounted device 602 (e.g., the on-board computing system 618 could be connected by wires or wirelessly connected to the head-mounted device 602). The on-board computing system 618 may include a processor and memory, for example. The on-board computing system 618 may be configured to receive and analyze data from the video camera 620, the sensor 622, and the finger-operable touch pad 624 (and possibly from other sensory devices, user-interfaces, or both) and generate images for output by the lens elements 610 and 612. The on-board computing system 618 may additionally include a speaker or a microphone for user input (not shown). An example computing system is further described below in connection with FIG. 7.

The video camera 620 is shown positioned on the extending side-arm 614 of the head-mounted device 602; however, the video camera 620 may be provided on other parts of the head-mounted device 602. The video camera 620 may be configured to capture images at various resolutions or at different frame rates. Video cameras with a small form-factor, such as those used in cell phones or webcams, for example, may be incorporated into an example embodiment of the system 600.

Further, although FIG. 6A illustrates one video camera 620, more video cameras may be used, and each may be configured to capture the same view, or to capture different views. For example, the video camera 620 may be forward facing to capture at least a portion of the real-world view perceived by the user. This forward facing image captured by the video camera 620 may then be used to generate an augmented reality where computer generated images appear to interact with the real-world view perceived by the user.

The sensor 622 is shown on the extending side-arm 616 of the head-mounted device 602; however, the sensor 622 may be positioned on other parts of the head-mounted device 602. The sensor 622 may include one or more of a gyroscope or an accelerometer, for example. Other sensing devices may be included within, or in addition to, the sensor 622 or other sensing functions may be performed by the sensor 622.

The finger-operable touch pad 624 is shown on the extending side-arm 614 of the head-mounted device 602. However, the finger-operable touch pad 624 may be positioned on other parts of the head-mounted device 602. Also, more than one finger-operable touch pad may be present on the head-mounted device 602. The finger-operable touch pad 624 may be used by a user to input commands. The finger-operable touch pad 624 may sense at least one of a position and a movement of a finger via capacitive sensing, resistance sensing, or a surface acoustic wave process, among other possibilities. The finger-operable touch pad 624 may be capable of sensing finger movement in a direction parallel or planar to the pad surface, in a direction normal to the pad surface, or both, and may also be capable of sensing a level of pressure applied to the pad surface. The finger-operable touch pad 624 may be formed of one or more translucent or transparent insulating layers and one or more translucent or transparent conducting layers. Edges of the finger-operable touch pad 624 may be formed to have a raised, indented, or roughened surface, so as to provide tactile feedback to a user when the user's finger reaches the edge, or other area, of the finger-operable touch pad 624. If more than one finger-operable touch pad is present, each finger-operable touch pad may be operated independently, and may provide a different function.

Figure 6B:
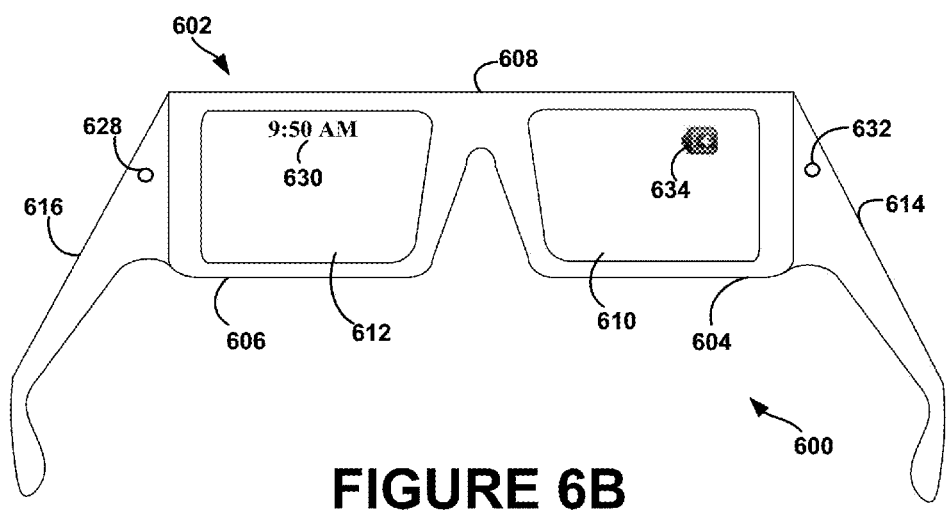
FIG. 6B illustrates an alternate view of the system illustrated in FIG. 5A.

FIG. 6B illustrates an alternate view of the system 600 illustrated in FIG. 6A. As shown in FIG. 6B, the lens elements 610, 612 may act as display elements. The head-mounted device 602 may include a first projector 628 coupled to an inside surface of the extending side-arm 616 and configured to project a display 630 onto an inside surface of the lens element 612. Additionally or alternatively, a second projector 632 may be coupled to an inside surface of the extending side-arm 614 and configured to project a display 634 onto an inside surface of the lens element 610.

The lens elements 610, 612 may act as a combiner in a light projection system and may include a coating that reflects the light projected onto them from the projectors 628, 632. In some embodiments, a reflective coating may be omitted (e.g., when the projectors 628, 632 are scanning laser devices).

In alternative embodiments, other types of display elements may also be used. For example, the lens elements 610, 612 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 604, 606 for driving such a matrix display. Alternatively or additionally, a laser or light emitting diode (LED) source and scanning system could be used to draw a raster display directly onto the retina of one or more of the user's eyes. Other possibilities exist as well.

Figure 7A:
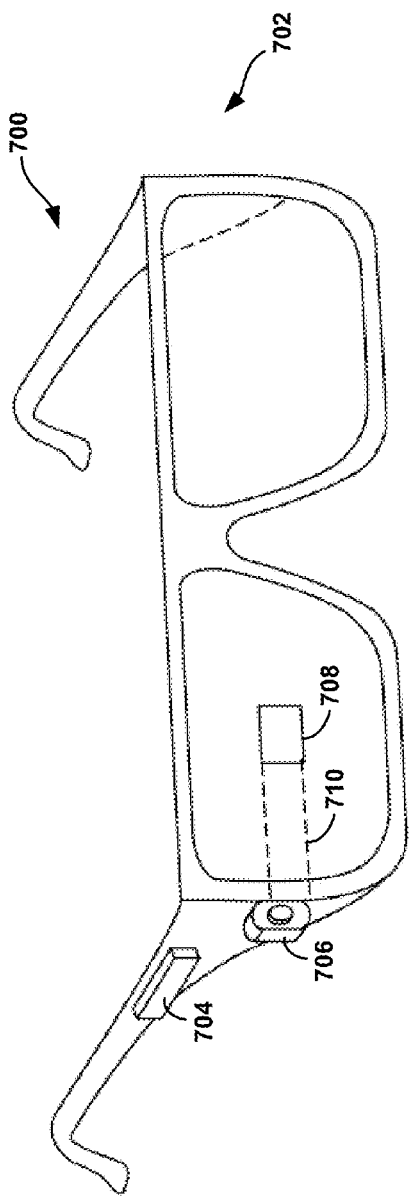
FIG. 7A illustrates another example system for receiving, transmitting, and displaying data.

FIG. 7A illustrates an example system 700 for receiving, transmitting, and displaying data. The system 700 is shown in the form of a wearable computing device 702, which may be implemented as the HMD discussed above, to intelligently zoom to and capture an image of a feature of interest. The wearable computing device 702 may include frame elements and side-arms such as those described with respect to FIGS. 6A and 6B. The wearable computing device 702 may additionally include an on-board computing system 704 and a video camera 706, such as those described with respect to FIGS. 6A and 6B. The video camera 706 is shown mounted on a frame of the wearable computing device 702; however, the video camera 706 may be mounted at other positions as well.

As shown in FIG. 7A, the wearable computing device 702 may include a single display 708 which may be coupled to the device. The display 708 may be formed on one of the lens elements of the wearable computing device 702, such as a lens element described with respect to FIGS. 6A and 6B, and may be configured to overlay computer-generated graphics in the user's view of the physical world. The display 708 is shown to be provided in a center of a lens of the wearable computing device 702, however, the display 708 may be provided in other positions. The display 708 is controllable via the computing system 704 that is coupled to the display 708 via an optical waveguide 710.

Figure 7B:
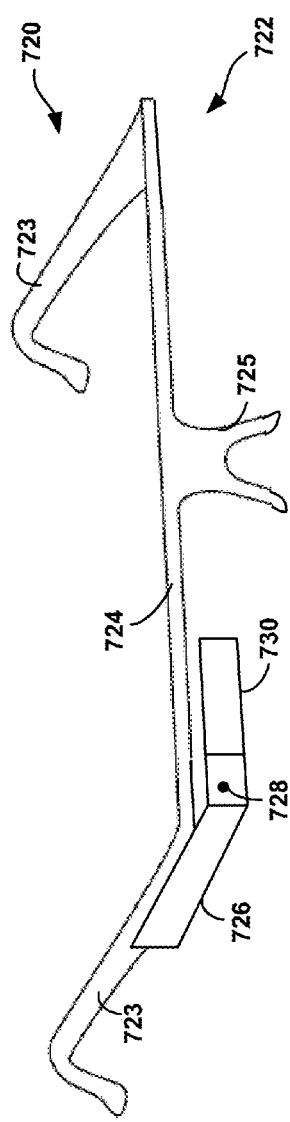
FIG. 7B illustrates yet another example system for receiving, transmitting, and displaying data.

FIG. 7B illustrates an example system 720 for receiving, transmitting, and displaying data. The system 720 is shown in the form of a wearable computing device 722. The wearable computing device 722 may include side-arms 723, a center frame support 724, and a bridge portion with nosepiece 725. In the example shown in FIG. 7B, the center frame support 724 connects the side-arms 723. The wearable computing device 722 does not include lens-frames containing lens elements. The wearable computing device 722 may additionally include an on-board computing system 726 and a video camera 728, such as those described with respect to FIGS. 6A and 6B.

The wearable computing device 722 may include a single lens element 730 that may be coupled to one of the side-arms 723 or the center frame support 724. The lens element 730 may include a display such as the display described with reference to FIGS. 6A and 6B, and may be configured to overlay computer-generated graphics upon the user's view of the physical world. In one example, the single lens element 730 may be coupled to a side of the extending side-arm 723. The single lens element 730 may be positioned in front of or proximate to a user's eye when the wearable computing device 722 is worn by a user. For example, the single lens element 730 may be positioned below the center frame support 724, as shown in FIG. 7B.

Figure 8:
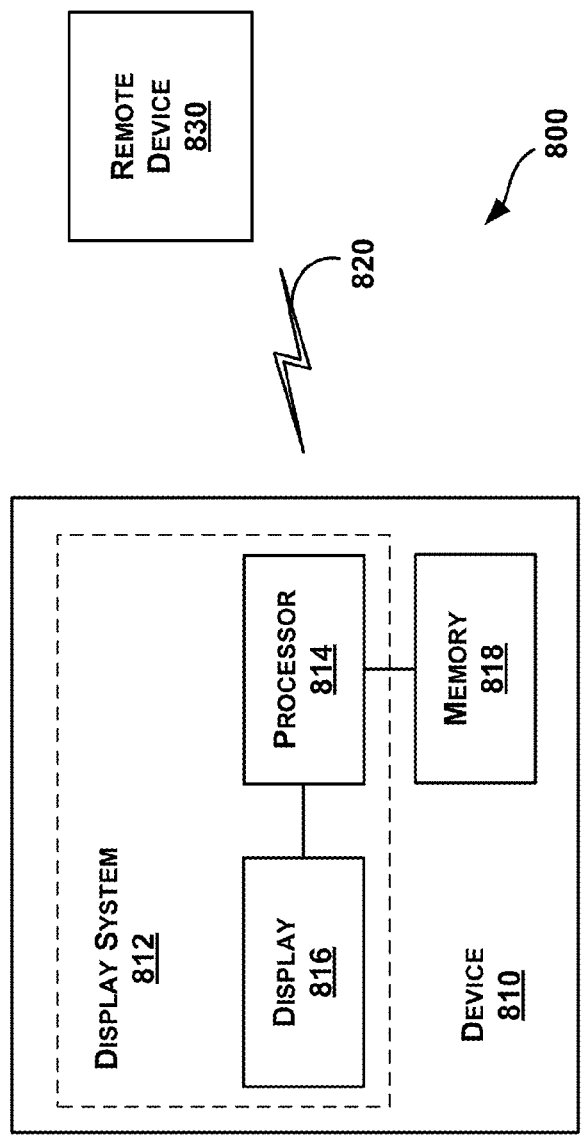
FIG. 8 illustrates a simplified block diagram of an example computer network infrastructure.

FIG. 8 shows a simplified block diagram of an example computer network infrastructure. In system 800, a device 810 communicates using a communication link 820 (e.g., a wired or wireless connection) to a remote device 830. The device 810 may be any type of device that can receive input data. For example, the device 810 may be a heads-up display system, such as the head-mounted device 602, 700, or 720 described with reference to FIGS. 6A-7B.

Thus, the device 810 may include a display system 812 including a processor 814 and a display 816. The display 816 may be, for example, an optical see-through display, an optical see-around display, or a video see-through display. The processor 814 may receive data from the remote device 830, and configure the data for display on the display 816. The processor 814 may be any type of processor, such as a micro-processor or a digital signal processor, for example.

The device 810 may further include on-board data storage, such as memory 818 coupled to the processor 814. The memory 818 may store software that can be accessed and executed by the processor 814, for example.

The remote device 830 may be any type of computing device or transmitter including a laptop computer, a mobile telephone, or tablet computing device, etc., that is configured to transmit data to the device 810. The remote device 830 and the device 810 may contain hardware to enable the communication link 820, such as processors, transmitters, receivers, antennas, etc.

In FIG. 8, the communication link 820 is illustrated as a wireless connection; however, wired connections may also be used. For example, the communication link 820 may be a wired serial bus such as a universal serial bus or a parallel bus, among other connections. The communication link 820 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device 830 may be accessible via the Internet and may include a computing cluster associated with a particular web service (e.g., social-networking, photo sharing, address book, etc.).

Figure 9:
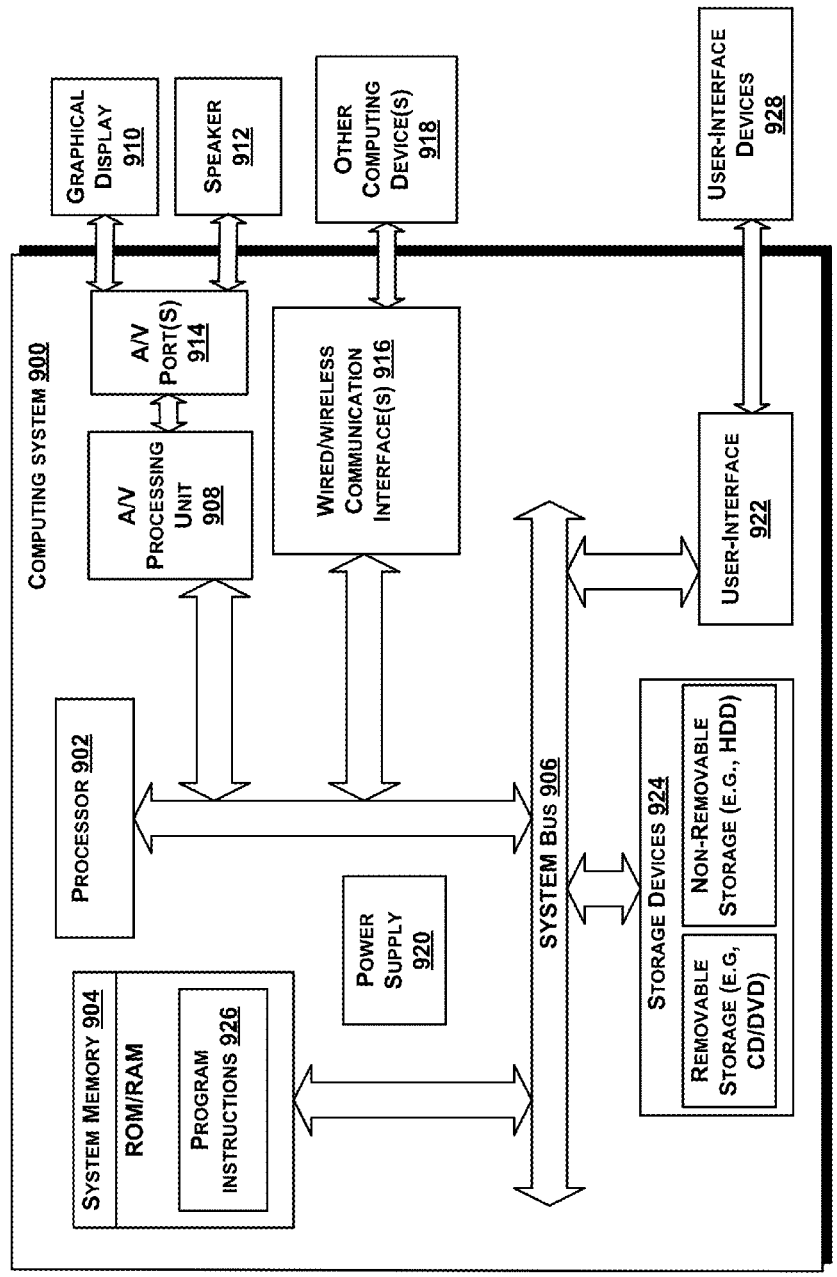
FIG. 9 illustrates a simplified block diagram depicting example components of an example computing system.

As described above in connection with FIGS. 6A-7B, an example wearable computing device may include, or may otherwise be communicatively coupled to, a computing system, such as computing system 618 or computing system 704. FIG. 9 shows a simplified block diagram depicting example components of an example computing system 900. One or both of the device 810 and the remote device 830 may take the form of computing system 900.

Computing system 900 may include at least one processor 902 and system memory 904. In an example embodiment, computing system 900 may include a system bus 906 that communicatively connects processor 902 and system memory 904, as well as other components of computing system 900. Depending on the desired configuration, processor 902 can be any type of processor including, but not limited to, a microprocessor (μP), a microcontroller (μC), a digital signal processor (DSP), or any combination thereof. Furthermore, system memory 904 can be of any type of memory now known or later developed including but not limited to volatile memory (such as RAM), non-volatile memory (such as ROM, flash memory, etc.) or any combination thereof.

An example computing system 900 may include various other components as well. For example, computing system 900 includes an A/V processing unit 908 for controlling graphical display 910 and speaker 912 (via A/V port 914), one or more communication interfaces 916 for connecting to other computing devices 918, and a power supply 920. Graphical display 910 may be arranged to provide a visual depiction of various input regions provided by user-interface module 922. For example, user-interface module 922 may be configured to provide a user-interface, and graphical display 910 may be configured to provide a visual depiction of the user-interface. User-interface module 922 may be further configured to receive data from and transmit data to (or be otherwise compatible with) one or more user-interface devices 928.

Furthermore, computing system 900 may also include one or more data storage devices 924, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 900.

According to an example embodiment, computing system 900 may include program instructions 926 that are stored in system memory 904 (and/or possibly in another data-storage medium) and executable by processor 902 to facilitate the various functions described herein including, but not limited to, those functions described with respect to FIG. 1. Although various components of computing system 900 are shown as distributed components, it should be understood that any of such components may be physically integrated and/or distributed according to the desired configuration of the computing system.

6. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses further describe aspects of the present description.

The invention claimed is:

1. A system comprising:
   at least one processor;
   a non-transitory computer readable medium; and
   program instructions stored on the non-transitory computer readable medium and executable by the at least one processor to perform functions comprising:
      receiving image data corresponding to a field of view of an environment;
      receiving input data indicative of a user input corresponding to a first interest criteria;
      determining a first feature of interest within the first field of view based on the first interest criteria;
      causing a camera to zoom to and capture a first image of a portion of the field of view that comprises the first feature of interest;
      acquiring a gradient value within a range of interest level values;
      determining, within the range of interest level values, a level of interest in the first feature of interest based on the gradient value;
      determining one or more attributes indicating a context of the first image;
      causing the first image of the first feature of interest to be stored in an image-attribute database, the image-attribute database comprising data for a set of images, wherein the data for a given image of the set of images specifies one or more attributes from a set of attributes; and
      displaying a subset of images from the image-attribute database on a display, wherein the subset of images includes the first image, and wherein each image in the subset of images shares at least one of the one or more attributes associated with the first image.

2. The system of claim 1, wherein the camera is attached to a head-mountable device (HMD), and wherein the image data is extracted from a point-of-view video captured by the camera.

3. The system of claim 1, further comprising program instructions stored on the non-transitory computer readable medium and executable by the at least one processor to perform functions comprising storing the image of the determined first feature of interest in an image-attribute database, wherein the level of interest is above a predetermined interest threshold.

4. The system of claim 3, wherein storing the image of the determined first feature of interest comprises:
   based on the gradient value, determining an image resolution at which to store the first image;
   causing the first image to be stored in the image-attribute database at the determined image resolution.

5. The system of claim 1, wherein the program instructions further comprise instructions that cause the at least one processor to perform functions comprising capturing a second image based on the level of interest.

6. The system of claim 5, wherein capturing a second image based on the level of interest further comprises:
   determining a second feature of interest within a second field of view of the environment based on the first interest criteria; and
   causing the camera to zoom to and capture a second image of the second feature of interest.

7. The system of claim 1, wherein the level of interest is below a predetermined interest threshold, and wherein capturing a second image based on the level of interest further comprises:
   determining a second feature of interest within the field of view of the environment based on a second interest criteria; and
   causing the camera to zoom to and capture a second image of the second feature of interest.

8. The system of claim 1, further comprising program instructions stored on the non-transitory computer readable medium and executable by the at least one processor to perform functions comprising:
   receiving eye-tracking data indicating a gaze direction, wherein the eye-tracking data is received from an eye-tracking device; and
   determining the first feature of interest within the first field of view based also on the obtained gaze direction.

9. The system of claim 1, further comprising program instructions stored on the non-transitory computer readable medium and executable by the at least one processor to perform functions comprising:
receiving eye-tracking data indicating pupil dilation, wherein the eye-tracking data is received from an eye-tracking device; and
determining the first feature of interest within the first field of view based also on a degree of pupil dilation.

10. The system of claim 1, further comprising program instructions stored on the non-transitory computer readable medium and executable by the at least one processor to perform functions comprising:
receiving physiological data indicating a physiological state, wherein the physiological data is received from one or more physiological sensors; and
determining the first feature of interest within the first field of view based also on the physiological state.

11. The system of claim 1, wherein causing a camera to zoom to and capture a first image of a portion of the field of view that comprises the first feature of interest further comprises:
determining characteristics of the first feature of interest; and
determining an extent of the zoom based on the characteristics of the first feature of interest.

12. The system of claim 1, wherein causing a camera to zoom to and capture a first image of a portion of the field of view that comprises the first feature of interest further comprises:
determining characteristics of the first feature of interest; and
determining a type of the zoom based on the characteristics of the first feature of interest.

13. A method comprising:
receiving image data corresponding to a field of view of an environment;
receiving input data indicative of a user input corresponding to a first interest criteria;
determining a first feature of interest within the first field of view based on the first interest criteria;
causing a camera to zoom to and capture a first image of a portion of the field of view that comprises the first feature of interest;
acquiring a gradient value within a range of interest level values;
determining, within the range of interest level values, a level of interest in the first feature of interest based on the gradient value;
determining one or more attributes indicating a context of the first image;
causing the first image of the first feature of interest to be stored in an image-attribute database comprising data for a set of images, wherein the data for a given image of the set of images specifies one or more attributes from a set of attributes; and
providing a subset of images from the image-attribute database on a display, wherein the subset of images includes the first image, and wherein each image in the subset of images shares at least one of the one or more attributes associated with the first image.

14. The method of claim 13, further comprising:
providing the image of the first feature of interest on a display; and
capturing a second image based on the level of interest.

15. The method of claim 13, wherein the level of interest is above a predetermined interest threshold, and wherein causing the first image of the first feature of interest to be stored comprises:
based on the gradient value, determining an image resolution at which to store the first image; and
storing the first image in the image-attribute database at the determined image resolution.

16. The method of claim 15, wherein the level of interest is below a predetermined interest threshold, and wherein capturing a second image based on the level of interest comprises:
determining a second feature of interest within the field of view of the environment based on a second interest criteria; and
causing the camera to zoom to and capture the second image of the second feature of interest.

17. A non-transitory computer-readable medium having stored thereon instructions executable by a computing device to cause the computing device to perform functions comprising:
receiving image data corresponding to a field of view of an environment;
receiving input data indicative of a user input corresponding to a first interest criteria;
determining a first feature of interest within the first field of view based on the first interest criteria;
causing a camera to zoom to and capture a first image of a portion of the field of view that comprises the first feature of interest;
providing the image of the first feature of interest on a display;
acquiring a gradient value within a range of interest level values;
determining, within the range of interest level values, a level of interest in the first feature of interest based on the gradient value;
determining one or more attributes indicating a context of the first image;
causing the first image and the one or more attributes to be stored in the image-attribute database; and
providing a subset of images from the image-attribute database on a display, wherein the subset of images includes the first image, and wherein each image in the subset of images shares at least one of the one or more attributes associated with the first image.

18. The non-transitory computer-readable medium of claim 17, wherein the functions further comprise capturing a second image based on the level of interest.

* * * * *